United States Patent
Yasui et al.

(10) Patent No.: US 7,947,381 B2
(45) Date of Patent: May 24, 2011

(54) ROTATING MACHINE AND PARTS OF THE SAME

(75) Inventors: Toyoaki Yasui, Hiroshima (JP);
Yoshikazu Yamada, Hiroshima (JP);
Katsuyasu Hananaka, Hiroshima (JP);
Satoshi Hata, Hiroshima (JP); Yuzo Tsurusaki, Hiroshima (JP); Osamu Isumi, Hiroshima (JP); Kazuhide Saito, Tokyo (JP); Kenichi Nemoto, Tokyo (JP); Yukiharu Suzuki, Tokyo (JP)

(73) Assignees: Mitsubishi Heavy Industries, Ltd., Tokyo (JP); Japan Kanigen Co. Ltd., Tokyo (JP)

( * ) Notice: Subject to any disclaimer, the term of this patent is extended or adjusted under 35 U.S.C. 154(b) by 912 days.

(21) Appl. No.: 11/360,508

(22) Filed: Feb. 24, 2006

(65) Prior Publication Data

US 2007/0054126 A1    Mar. 8, 2007

(30) Foreign Application Priority Data

Sep. 2, 2005    (JP) ................. 2005-255480

(51) Int. Cl.
*B32B 15/01* (2006.01)
*F01D 5/00* (2006.01)

(52) U.S. Cl. ........ 428/680; 428/614; 428/421; 428/687; 416/241 R; 416/241 A; 416/241 B

(58) Field of Classification Search .................. 428/613, 428/614, 615, 627, 634, 421, 422, 457, 687, 428/624, 626, 680; 416/241 R, 241 A, 241 B
See application file for complete search history.

(56) References Cited

U.S. PATENT DOCUMENTS

| | | | | |
|---|---|---|---|---|
| 3,421,972 A | * | 1/1969 | Cromwell et al. | 428/551 |
| 4,666,786 A | | 5/1987 | Yano et al. | |
| 6,617,047 B1 | * | 9/2003 | Huffer et al. | 428/624 |
| 6,630,198 B2 | | 10/2003 | Ackerman et al. | |
| 2002/0189437 A1 | * | 12/2002 | Jee et al. | 92/71 |

FOREIGN PATENT DOCUMENTS

| | | |
|---|---|---|
| DE | 33 33 121 A1 | 3/1985 |
| DE | 35 03 859 C2 | 9/1985 |
| DE | 37 16 935 A1 | 12/1988 |
| DE | 196 10 055 C1 | 4/1997 |

(Continued)

OTHER PUBLICATIONS

German Office Action (with English translation) issued in German Patent Application No. 10 2006 008 465.9-45, dated Aug. 22, 2007.

(Continued)

*Primary Examiner* — Gwendolyn Blackwell
(74) *Attorney, Agent, or Firm* — Wenderoth, Lind & Ponack L.L.P.

(57) ABSTRACT

The present invention provides parts of a rotation machine which effectively prevent particulates, such as silica, iron oxide, and other particles, contained in a gas to adhere to the rotating machines which work with the gases containing the particulates. An intermediated metal-plated film and a plated film containing fluorocarbon polymer particles provided on the intermediate metal-plated film are deposited on the surfaces of moving blades used in a steam turbine. The plated film containing the fluorocarbon polymer particles includes fluorocarbon polymer particles made of any of Ni-based metals and a plated matrix, and some of the fluorocarbon polymer particles are exposed at the surfaces of the plated matrix.

18 Claims, 7 Drawing Sheets

FOREIGN PATENT DOCUMENTS

| | | | |
|---|---|---|---|
| JP | 07-040506 | * | 2/1995 |
| JP | 7-40506 | | 2/1995 |
| JP | 07-247949 | * | 9/1995 |
| JP | 9-314142 | | 12/1997 |
| JP | 2001-153063 | * | 6/2001 |
| JP | 2002-242613 | | 8/2002 |
| JP | 2002-317298 | | 10/2002 |
| JP | 2002-348699 | * | 12/2002 |
| JP | 2004-100006 | | 4/2004 |
| JP | 2004-156624 | | 6/2004 |

OTHER PUBLICATIONS

Japanese Office Action issued Jul. 9, 2009 in corresponding Japanese Application No. 2005-255480 (with partial English Translation).

Decision of a Patent Grant (with English translation) issued Mar. 16, 2010 in connection with corresponding Japanese Application No. 2005-255480.

* cited by examiner

ROTATING MACHINE AND PARTS OF THE SAME

CROSS-REFERENCE TO RELATED APPLICATIONS

This application is based upon and claims the benefit of priority from Japanese Patent Application No. 2005-255480, filed Sep. 2, 2005, the entire contents of which are incorporated herein by reference.

BACKGROUND OF THE INVENTION

1. Field of the Invention

The present invention relates to a rotating machine for example a steam turbine or a compressor, and more particularly, to a rotating machine and the parts of the rotating machine, which are capable of preventing particulates from adhering onto the parts of the rotating machine such as a rotor and moving blades when a gas containing the particulates comes into contact with the parts of the rotating machine.

2. Description of the Related Art

A steam turbine is driven under the principle that a steam, namely a working fluid, is sprayed onto moving blades of the turbine. The steam comes into direct contact with parts, such as moving blades and a rotor, attached to a rotating machine. On the other hand, a compressor used for compressing various kinds of gases in chemical plants operates under the principle that impellers rotate when power is supplied from an external source, achieving the compression of the gases. The parts, such as the impellers and the rotor, of this type of rotating machine, namely the compressor, come into direct contact with the gas.

The steam, namely a working fluid for the steam turbine, and the various kinds of gases to be compressed by the compressor, contain particulates such as corpuscular silica, iron oxide, or hydrocarbon particles. In this context, a problem has arisen in that the particulates adhere to the moving blades and the impellers when the steam or various kinds of gases come into direct contact with these parts of the rotating machine, thereby deteriorating the working efficiency of the rotating machine. To solve this problem in the conventional art, a triple-layer film with its top layer coated with an organic paint containing fluorocarbon polymer particles is deposited on the surfaces of the moving blades of the steam turbine and impellers of the compressor is known (refer to, for example, "Performance Maintenance of Centrifugal Compressors Through the Use of Coatings to Reduce Hydrocarbon Fouling" by Ronald Chow of Novacor Chemicals, Bruce Mcmordie of Sermatech International, and Richard Wiegand of Elliott Company).

On the other hand, the coated films according to the conventional art disclosed in this literature have a disadvantage in that the particulates such as corpuscular silica and iron oxide particles can not been satisfactorily prevented from adhering and so, further improvement is needed.

SUMMARY OF THE INVENTION

An object of the present invention, which has been devised in the light of the above situation, is to provide a rotating machine that works with gases containing particulates such as corpuscular silica, iron oxide, and other particles, and to provide parts of the rotating machine, all of which are capable of effectively preventing the particulates contained in these gases from adhering to the rotating machine and the parts of the rotating machine.

According to one aspect of the present invention, the parts of a rotating machine include a with which a gas containing particulates comes in contact, and a plated film deposited on the surface of the structure containing a plated matrix and fluorocarbon polymer particles, wherein the fluorocarbon polymer particles are contained in the plated matrix and at least a part of the fluorocarbon polymer particles are exposed from the surface of the plated matrix.

According to another aspect of the present invention, a rotating machine includes a rotating portion with which a gas containing particulates comes into contact, and parts of the rotating machine provided on the rotating portion.

According to still another aspect of the present invention, the parts of a rotating machine include a structure with which a gas containing particulates comes in contact, and a plated film deposited on the surface of the structure containing a plated matrix and fluorocarbon polymer particles, wherein the fluorocarbon polymer particles are contained in the plated matrix and at least a part of the fluorocarbon polymer particles are exposed from the surface of the plated matrix, and an intermediate plated film deposited between the plated film is and the surface of the structure.

According to still another aspect of the present invention, a rotating machine includes a rotating portion with which a gas containing particulates comes into contact, and parts of the rotating machine are provided on the rotating portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Now, with reference to accompanying drawings, the present invention is described in detail below. It should be noted that the invention in its broader aspects is not limited to the specific details and representative embodiments shown and described below. The constituting elements of embodiments of the present invention described below include other constituting elements which may be easily derived by any person skilled in the art, and are assumed to be substantially the same as the constituting elements according to the embodiments of the present invention.

Embodiment 1

According to Embodiment 1, a plated film deposited on parts of a rotating machine is characterized in that the plated film containing plated matrix and the fluorocarbon polymer particles is deposited on the surfaces of the parts of a rotating machine.

Figure 1:
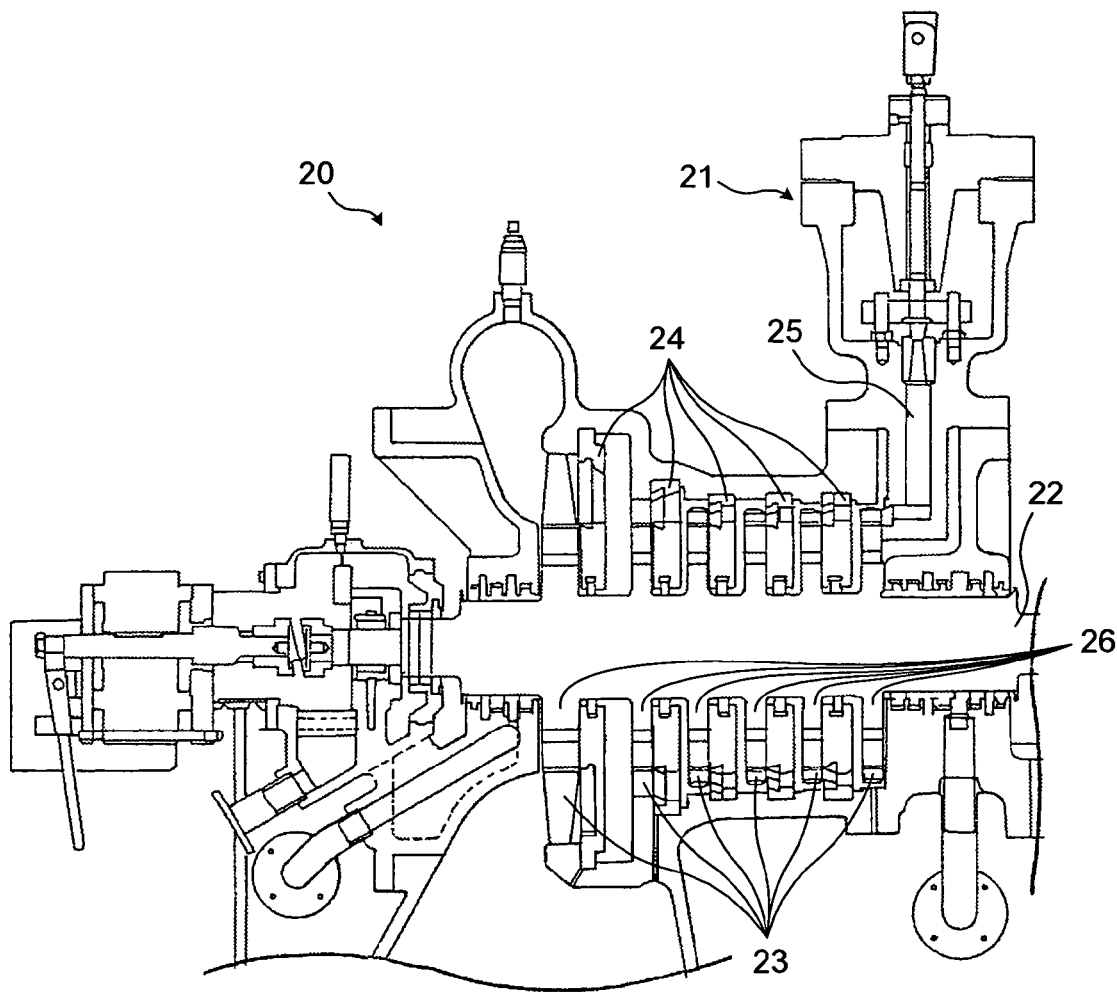
FIG. 1 is a sectional view showing an area in the vicinity of a turbine chamber, with a steam turbine with moving blades on the surfaces of which plated films according to an embodiment of the present invention are deposited.

FIG. 1 is a sectional view showing an area in the vicinity of a turbine chamber, with a steam turbine with moving blades on the surfaces of which plated films according to the Embodiment 1 are deposited. The steam turbine 20, namely the rotating machine according to Embodiment 1, converts the steam pressure supplied from a steam feed pipe 25, for which switching is controlled by a steam inlet valve 21, into rotating power. The rotating power is used in, for example, a generator via a reduction gear. A plurality of turbine disks 26 are disposed on a rotor axis 22 to pull out the rotating power. On the circumferences of the turbine disks 26, a plurality of moving blades 23 are disposed in a line to form a rotor moving blade array. The moving blades 23 rotate the rotor axis 22 when receiving the steam supplied from the steam feed pipe 25.

Nozzle partition boards 24, which are disposed between the moving blades 23 and each of which has a plurality of nozzle vanes, regulate the steam to efficiently hit against the moving blades 23. As shown in FIG. 1, in the case where the steam turbine 20 has a plurality of rotor blade arrays, a plurality of nozzle vanes are disposed, accordingly. In this case, the numbers and sizes of nozzle vanes, which are attached to each of the nozzle partition boards 24, are variable in many cases but they have the same constitutions.

Figure 2:
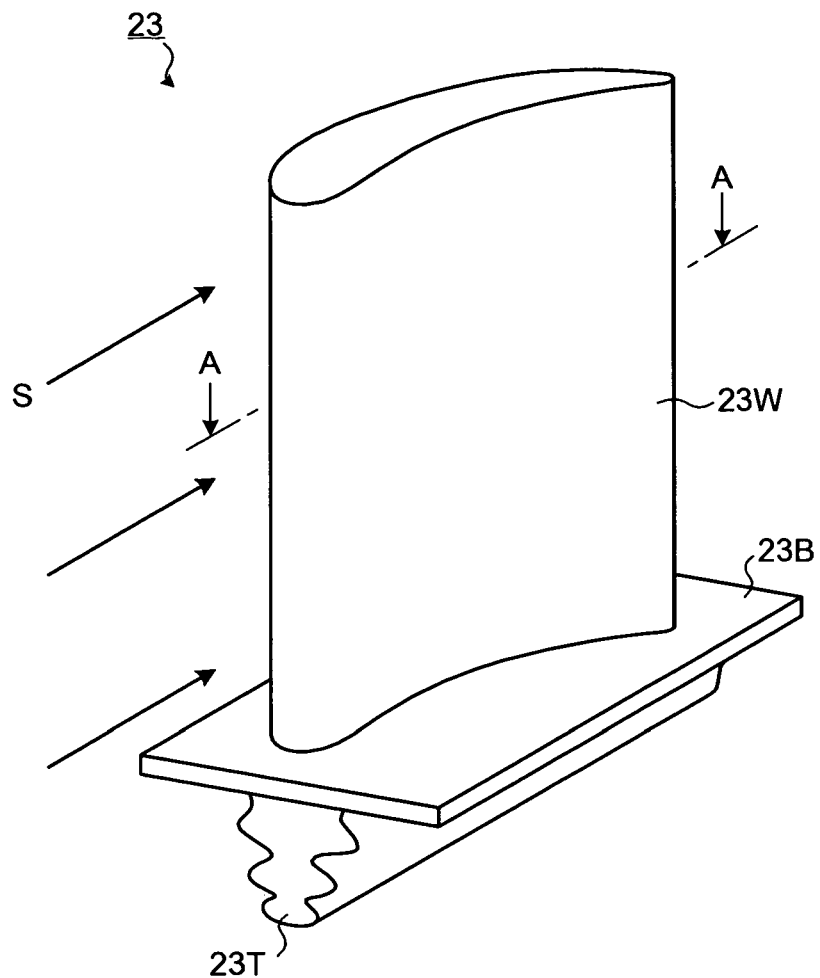
FIG. 2 is a perspective view showing the moving blades of the steam turbine, on the surfaces of which the plated films according to the embodiment of the present invention are deposited.
Figure 3:
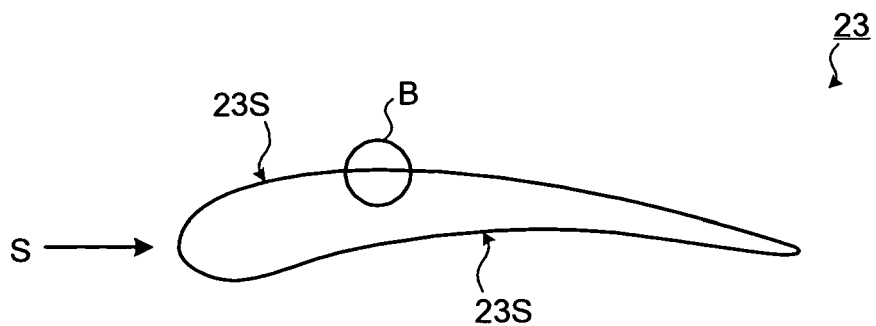
FIG. 3 is a sectional view taken from an A-A line in FIG. 2.

FIG. 2 is a perspective view showing the moving blades of the steam turbine, on surfaces of which the plated films containing the fluorocarbon polymer particles according to Embodiment 1 are deposited. FIG. 3 is a sectional view taken from an A-A line in FIG. 2. A blade 23W of the moving blade 23, which is the part of the steam turbine 20, namely the rotating machine, is disposed on a base 23B. In addition, a blade holding part 23T is disposed on the opposite side of the blade 23W on the base 23B. The blade holding part 23T is fitted into a blade mounting groove of the same shape as the shape of a blade mounting groove for a blade holding part formed on the circumference of the turbine disk 26 and attached to the turbine disk.

The moving blades 23 disposed at the steam turbine 20 rotate together with the turbine disks 26 when a hot steam is sprayed on the moving blades 23 under a high pressure. For this reason, the moving blades 23 attain large centrifugal acceleration and are exposed to a high temperature. Accordingly, the moving blades 23 are made of high-strength and heat-resistant materials. According to Embodiment 1, the moving blades 23 are made of martensitic stainless steel.

In the steam turbine 20, the particulates such as the $SiO_2$ or iron oxide ($Fe_3O_4$) particles contained in the steam adhere onto the surfaces 23S of the moving blades 23 and the surfaces of the nozzle vanes. Moreover, even in a rotating machine such as a compressor, the particulates such as the hydrocarbon (HC) or silica particles contained in a gas to be compressed adhere to the surfaces of the parts which come into contact with the gas. Furthermore, long running of the steam turbine causes the particulates to deposit on the surfaces 23S of the moving blades 23 and the surfaces of the nozzle vanes, thereby deteriorating the heat efficiency of the steam turbine and the compression efficiency of the compressor.

To solve the aforementioned problem, according to Embodiment 1, the plated films containing particles of fluorocarbon polymer are deposited on the surfaces 23S of the moving blades 23. This prevents the particulates contained in the steam from adhering to the surfaces 23S of the moving blades 23. Now, the plated films are in detail described below.

Figure 4:
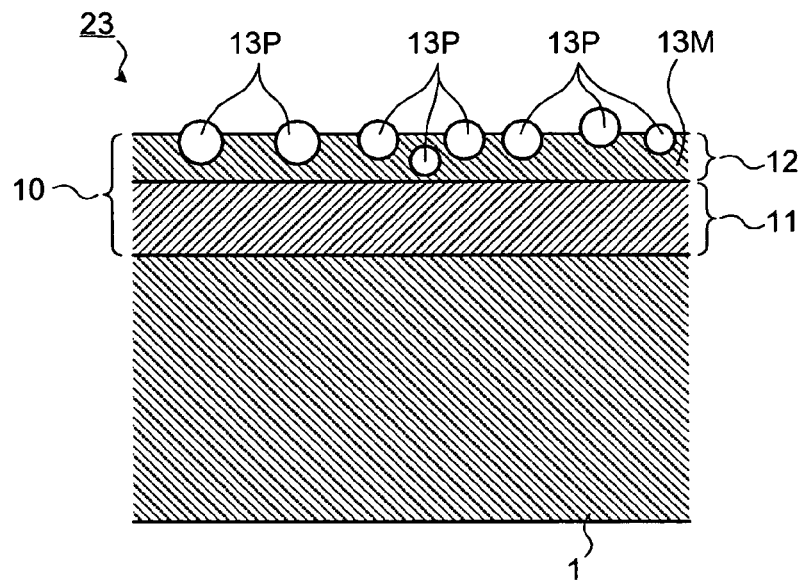
FIG. 4 is a schematic view showing the surface of the moving blades according to the embodiment of the present invention.

FIG. 4 is a schematic view showing the surface of the rotor blade according to Embodiment 1. This schematic view is a view of the enlarged surface 23S (a portion marked by a circle B in FIG. 3) of the moving blade 23 according to Embodiment 1. In the moving blade 23 according to Embodiment 1, the plated film 10 is deposited on the surface of the base material (martensitic stainless steel) 1. The plated film 10 is composed of an intermediate film 11 containing no fluorocarbon polymer particles, which is deposited on the base material 1 of the moving blade 23, and a plated film 12 containing the fluorocarbon polymer particles 13P, which are included in a plated matrix 13M, the plated film 12 being deposited on the intermediate film 11. As shown in FIG. 4, some of the fluorocarbon polymer particles 13P are exposed at the surface of the plated film 12.

According to Embodiment 1, the plated matrix 13M of the plated film 12 may be made of any of the Ni-based metals, for example Ni—P or Ni—B. According to Embodiment 1, Ni—P is used for the Ni-based metal. In addition, according to Embodiment 1, the intermediate film 11 containing no fluorocarbon polymer particles is deposited to improve the adhesiveness between the base material 1 and the plated film 12 containing the fluorocarbon polymer particles. The intermediate film 11 containing no fluorocarbon polymer particles described herein is made of any of the Ni-based metals, for example Ni—P or Ni—B, as with the plated matrix 13M of the plated film 12 containing the fluorocarbon polymer particles. The intermediate plated film 11 may be a Ni-plated film.

Figure 5:
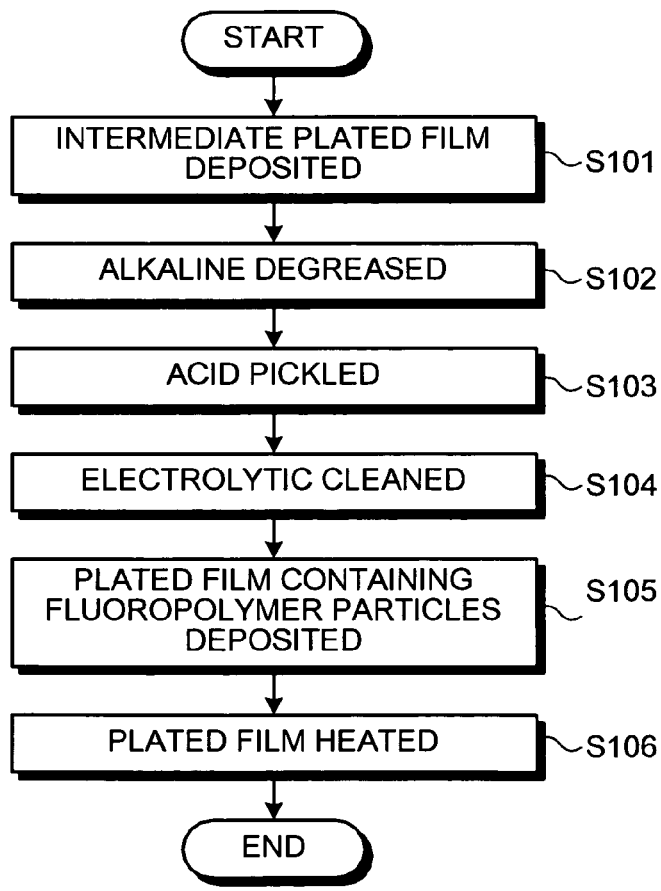
FIG. 5 is a flowchart explaining a procedure for depositing the plated films according to the embodiment of the present invention.

FIG. 5 is a flowchart explaining a procedure for depositing the plated films according to Embodiment 1. First, by electroplating, the intermediate film 11 is deposited on the surface of the moving blade 23, namely a member, on which a metal is plated (step S101). The intermediate film 11 is preferably deposited by electroplating such as the Watts bath technique using a Ni electroplating liquid. This improves the crack-resistance of the plated film 10.

A given level of strength is required, in particular, for the parts of the rotating machine such as the moving blades 23 of the steam turbine 20. In this view, it is preferable that the intermediate plated film 11 is formed with Ni by electroplating to improve the crack-resistance of the plated film 10. It is more preferable that rather than Ni—P, Ni is used to form the intermediate plated film 11 because the adhesiveness of the plated film 12 containing the fluorocarbon polymer particles is improved.

Note that the intermediate plated film 11 may be deposited by electroless plating using an electroless plating liquid such as Ni—P (for example, a method using autocatalytic reactions by any of the metals belonging to the eighth group in the periodic table, which is described in detail below). By doing so, the intermediate plated film 11 may be homogeneously deposited even on the surfaces of three-dimensional parts. In addition, according to Embodiment 1, the thickness of the intermediate plated film 11 is not limited to any given thickness but preferably, it falls in the range from approximately 0.5 μm to 10 μm.

Next, the plated film 12 containing the fluorocarbon polymer particles is deposited on the intermediate plated film 11. The plated film 12 containing the fluorocarbon polymer particles is deposited by adding the fluorocarbon polymer particles 13P in the plating liquid and performing electroless plating on the moving blade 23 using the resultant plating liquid. For the electroless plating technique described herein, a method, for example, using autocatalytic reactions by the metal (Ni) belonging to the eighth group in the periodic table, is used, which is described in detail below.

First, the surface of the moving blade 23, on which the intermediate Ni-plated film 11 has been deposited, is alkaline degreased (step S102). Second, the surface of the moving blade 23 is acid pickled (step S103) and then electrolytically cleaned (step S104). The acid pickling and electrolytic cleaning steps are intended to activate the surface of the intermediate plated film 11, on which the plated film 12 containing the fluorocarbon polymer particles is deposited.

Next, the plated film 12 containing the fluorocarbon polymer particles is deposited on the intermediate plated film 11 deposited on the surface of the moving blade 23 (step S105). In this plating process, as soon as hypophosphorous anions in the plating liquid come into contact with any of the metals belonging to the eighth group in the periodic table (according to Embodiment 1, Ni contained in the intermediate plated film 11) under given conditions, the metal catalyses a dehydrogenation decomposition as represented by formula (1). Note that the fluorocarbon polymer particles 13P have been added in the plating liquid.

$$[H_2PO_2]^- + H_2O \rightarrow H[HPO_3]^- + 2H \quad (1)$$

The hydrogen atoms generated through the reaction represented by formula (1) are adsorbed on the surface of a catalytic metal (the intermediate plated film 11 in this embodiment) to make a so-called condensed layer and activated. As soon as the activated hydrogen atoms come into contact with Ni cations in the plating liquid, based on the reaction represented by formula (2), Ni cations are reduced to Ni metal and precipitated on the surface of the catalytic metal (the intermediate plated film 11, namely Ni in this embodiment).

$$Ni^{++} + 2H \rightarrow Ni^O + 2H^+ \quad (2)$$

In addition, the activated hydrogen atoms on the surface of the catalytic metal react with hypophosphorous anions in the plating liquid to reduce phosphorous (P) contained in hypophosphorous anion, producing an alloy with Ni. This allows the precipitated Ni to catalyze and continuously advance the Ni-reduction plating reactions similar to the reactions represented by formulae (1) and (2). In other words, the plating process continuously advances by the Ni autocatalyst reactions. In the process of depositing Ni contained in the plating liquid by the reactions, the fluorocarbon polymer particles 13P added in the plating liquid are adsorbed on the intermediate film 11 and retained by the precipitated Ni.

According to Embodiment 1, the plated film 12 containing the fluorocarbon polymer particles is deposited by a method utilizing the autocatalyst reactions of any of the metals belonging to the eighth group in the periodic table. Alternatively, the plated film 12 containing the fluorocarbon polymer particles may be deposited by electroplating. Note that the plated film 12 is deposited by a method utilizing the autocatalyst reactions of any of the metals belonging to the eighth group in the periodic table, the plated film 12 containing the fluorocarbon polymer particles may be homogeneously deposited even on the surfaces of three dimensional parts. In addition, according to Embodiment 1, the thickness of the plated film 12 containing the fluorocarbon polymer particles is not limited to any given thickness but preferably, it is approximately more than or equal to 1 μm and approximately less than or equal to 10 μm.

By the above procedure, the plated film 10 composed of the intermediate plated film 11 and the plated film 12 containing the fluorocarbon polymer particles is deposited on the moving blade 23, namely the member on the surface of which the plated film is deposited. After depositing the plated film 10 (step S105), the moving blade 23 with the plated film 10 deposited on it moves to the heat treatment step, in which the moving blade 23 is heated at a temperature in the range from 300° C. to 350° C. for a given time period (step S106). The heat treatment process softens and lays down the fluorocarbon polymer particles contained in the plated film 12. This may prevent the fluorocarbon polymer particles 13P from peeling off, and the effect of preventing particles from adhering may remain for a long period.

Thus, by depositing the plated film 12 containing the fluorocarbon polymer particles on the surface 23S of the moving blade 23, which comes in contact with the steam, the amount of the particulates adhered on the surface 23S, such as the $SiO_2$ and iron oxide ($Fe_3O_4$) particles, may be reduced.

It is preferable that in the plan view, the ratio of the exposed particles of the fluorocarbon polymer particles 13P from the surface within a given area of the plated film 12 (surface occupation ratio) is 10% or greater. When the surface occupation ratio is less than 10%, the amount of the particulates adhered on the surface 23S of the moving blade 23 contained in the steam, such as the $SiO_2$ and iron oxide ($Fe_3O_4$) particles might be increased. If the surface occupation ratio falls within 10% or greater, the amount of the particulates adhered may be effectively reduced. From the standpoint of reducing the amount of the particulates, more preferably the surface occupation ratio is greater than or equal to 20%. In other words, from the standpoint of reducing the amount of the particulates, the surface occupation ratio is preferably as large as possible. On the other hand, too large surface occupation ratios deteriorate the power of the plated matrix 13M for retaining the fluorocarbon polymer particles 13P, which in turn, may cause the fluorocarbon polymer particles 13P to peel off. Thus, the surface occupation ratio is preferably less than or equal to 40%. By doing so, it is ensured that the fluorocarbon polymer particles 13P are retained in the plated matrix 13M of the plated film 12 containing the fluorocarbon polymer particles.

The diameters of the fluorocarbon polymer particles 13P fall preferably within the range from approximately 0.1 μm to 1 μm considering their dispersibility in the plating liquid and the surface occupation ratio. The diameter of the fluorocarbon polymer particle 13P is determined by, for example, the size of a mesh used in classifying the fluorocarbon polymer particles 13P. In other words, if the mesh is square-shaped, the length of one side of the mesh corresponds to the diameter of the fluorocarbon polymer particle 13P. The diameter of the fluorocarbon polymer particle 13P is an average value of the diameters of the fluorocarbon polymer particles 13P.

Fluorocarbon polymer particle 13P may be composed of at least one of a compound selected from the group consisting of polytetrafluoroethylene (PTFE), tetrafluoroethylene-hexafluoropropylene copolymer (FEP), tetrafluoroethylene-perfluoroalkylvinylether copolymer (PFA), polyvinylidene-fluoride (PVDF), ethylene-chlorotrifluoro ethylene copolymer (ECTFE), and ethylene-tetrafluoro ethylene copolymer (ETFE).

Modified Example 1

Figure 6A:
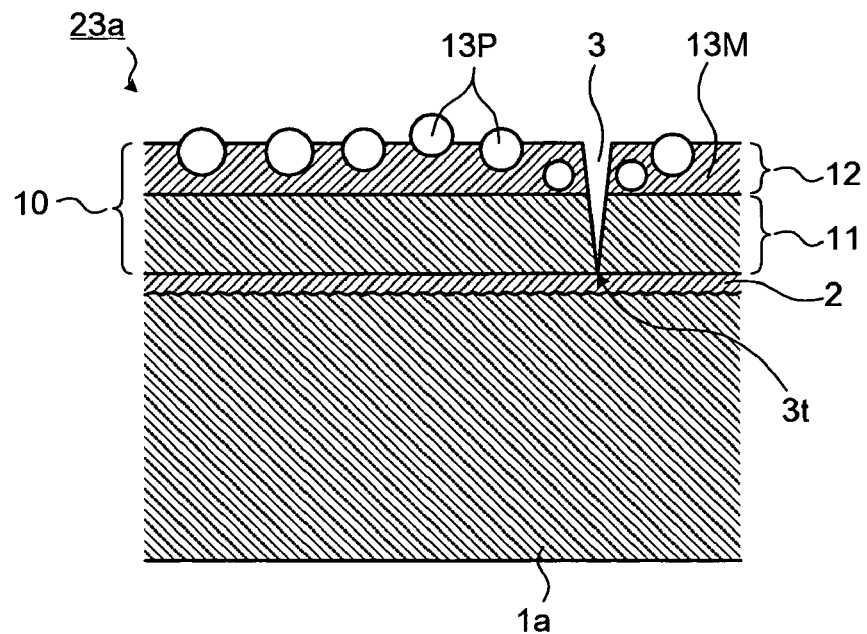
FIG. 6A is a schematic view showing the surface of a moving blade according to the first Modified Example of the embodiment of the present invention.
Figure 6B:
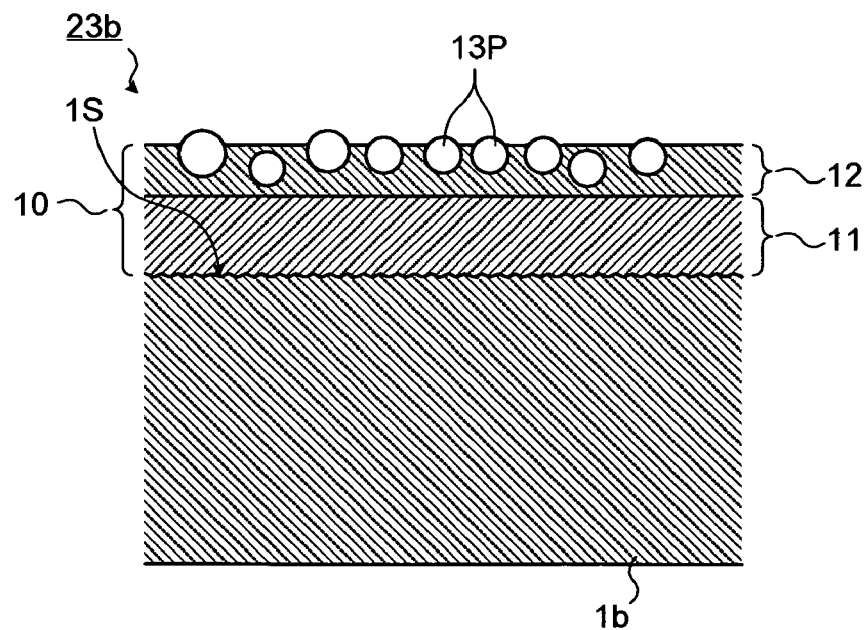
FIG. 6B is a schematic view showing the surface of the moving blade according to the first Modified Example of the embodiment of the present invention.

FIGS. 6A and 6B are schematic views showing the surface of the moving blade according to Modified Example 1 of Embodiment 1. Modified Example 1 has almost the same constitution as the constitution of Embodiment 1 with an exception that the surface of the moving blade, on which the plated film is deposited, has been modified so that its fatigue strength may be improved. The description of the remaining constitution is omitted because of it being the same as the constitution of Embodiment 1. It should be noted that the constitution of Embodiment 1 may be applied to Modified Example 1 if appropriate.

In the case where the plated film 10 composed of the intermediate plated film 11 and the plated film 12 containing the fluorocarbon polymer particles is deposited on the surface of the moving blade, the fatigue strength of the base material deteriorates in the process of depositing the plated film 10. As shown in FIG. 6A, the particles contained in the steam may collide with the plated film 10, thereby causing the plated film 10 to break, and creating a crack 3 in the plated film 10. If the crack 3 reaches the base material 1a, large stress is exerted on the point of the base material 1a, at which a tip 3t of the crack 3 meets. Starting at this point, breakage due to the fatigue proceeds in the base material 1a.

The base material 1a of the moving blade 23a, or the like, is previously treated with a surface modification treatment to improve the fatigue strength of the base material before the intermediate plated film 11 is deposited on the base materials 1a and 1b of the moving blades 23a and 23b shown in FIGS. 6A and 6B. As shown in FIG. 6A, the surface of the base material 1a of the moving blade 23a is nitrided to form a nitrided layer 2. This improves the fatigue strength of the base material 1a. Next, on the nitrided layer 2, the intermediate plated film 11 and then the plated film 12 containing the fluorocarbon polymer particles are deposited to form the plated film 10.

Furthermore, a shot peening process is applied on the surface of the base material 1b of the moving blade 23b shown in FIG. 6B. This improves the fatigue strength of the base material 1b. Next, on the surface of the shot-peened base material 1b, the intermediate plated film 11 and then the plated film 12 containing the fluorocarbon polymer particles are deposited to form the plated film 10. Accordingly, the surfaces of the base materials composing the moving blades are modified by a surface modification treatment to improve their fatigue strength before the intermediate plated film 11 is deposited on the surfaces of the base materials, and therefore breakage due to fatigue in the base materials 1a and 1b may be prevented from proceeding even if a crack occurring in the plated film 10 reaches the base material 1a and 1b. Modified Example 1 has an advantage in that although the nitriding process somewhat deteriorates the corrosion-resistance of the base materials, the shot peening process less deteriorates the corrosion-resistance of the base material 1b than the nitriding process.

In Modified Example 1, the nitriding and shot peening processes are described as the surface modification treatment for improving the fatigue strength of the base materials. Alternatively, for example, any of the processes such as a carburization and a case-hardening process may be used for the surface modification treatment to improve the fatigue strength of the base materials. Note that it is preferable that the nitriding or shot peening process is used because the adhesiveness between the base material 1a, 1b and the intermediate plated film 11 or the plated film 12 containing the fluorocarbon polymer particles is improved.

Modified Example 2

Figure 7:
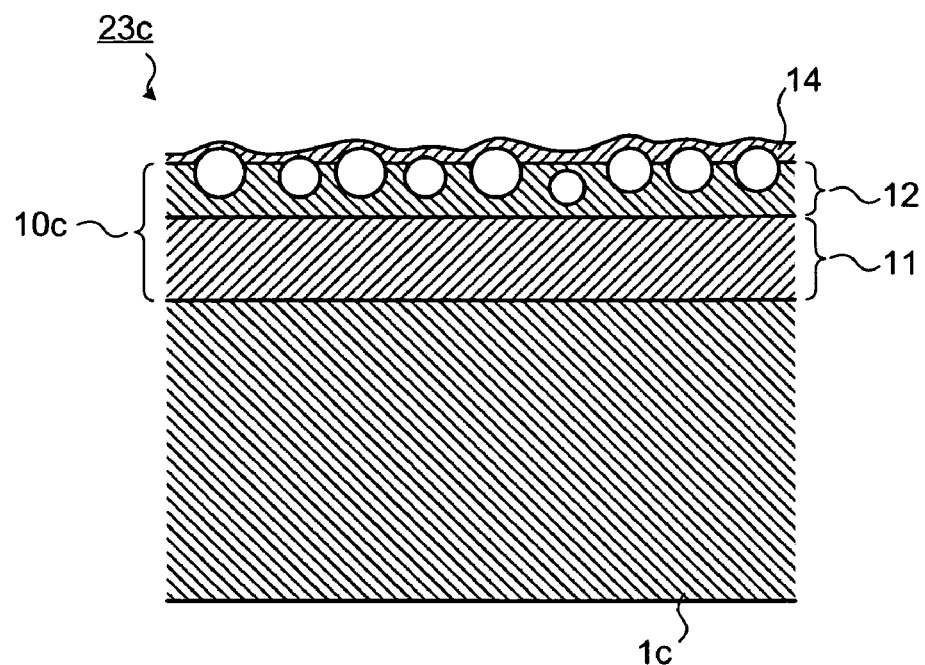
FIG. 7 is a schematic view showing the surface of the moving blade according to the second Modified Example of the embodiment of the present invention.

FIG. 7 is a schematic view showing the surface of the moving blade according to Modified Example 2 of Embodiment 1. Modified Example 2 has almost the same constitution as the constitution of Embodiment 1 with an exception that an additional fluorocarbon polymer film is provided on the surface of the plated film containing the fluorocarbon polymer particles. The fluorocarbon polymer film is typified by a fluorine particle dispersion liquid for Kaniflon (registered trademark) provided by Japan Kanigen Co., Ltd. The remaining constitution is the same as the constitution of Embodiment 1, and therefore the description of the remaining constitution is omitted. Note that the constitutions of Embodiment 1 and Modified Example 1 may be applied to Modified Example 2, if appropriate.

In the plated film 10c provided on the surface of the moving blade 23c, an additional fluorocarbon polymer film 14 is deposited on the plated film 12 containing the fluorocarbon polymer particles. The fluorocarbon polymer film 14 is composed of fluorocarbon polymer particles, the diameters of which are on the order of submicrons. The fluorocarbon polymer film 14 is formed by applying a coating liquid in which the fluorocarbon polymer particles with diameters on the order of submicrons have been dispersed on the plated film 12 containing the fluorocarbon polymer particles. This may improve the area occupation ratio of the fluorocarbon polymer to the plated film 10c, and therefore the particulates such as the $SiO_2$ particles contained in the steam or the gases to be compressed are effectively prevented from adhering. Here, the same material may be used for the fluorocarbon polymer constituting the fluorocarbon polymer film 14 as the material for the fluorocarbon polymer particles 13P.

Modified Example 3

Figure 8:
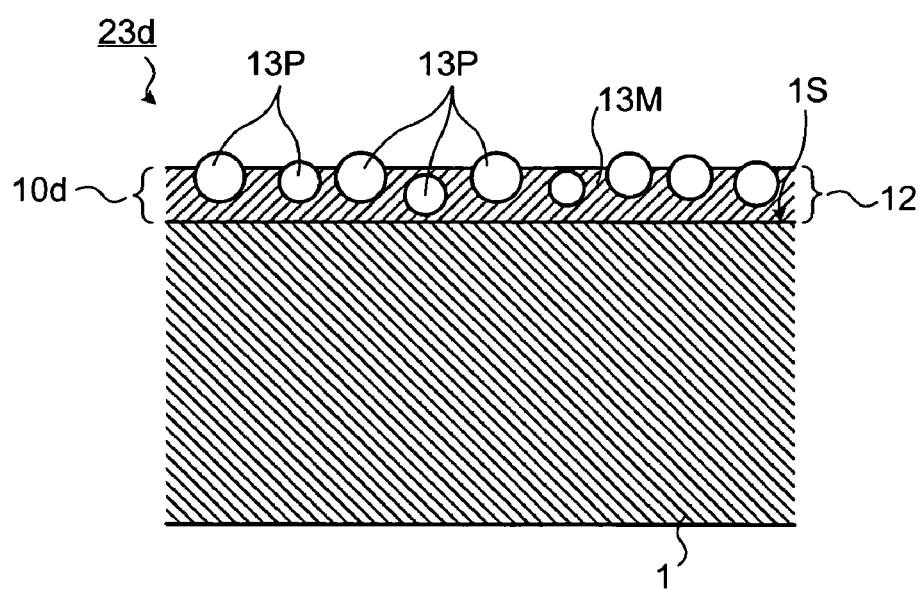
FIG. 8 is a schematic view showing the surface of the moving blade according to the third Modified Example of the embodiment of the present invention.

FIG. 8 is a schematic view showing the surface of the moving blade according to Modified Example 3 of Embodiment 1. Modified Example 3 has almost the same constitution as the constitution of Embodiment 1 with an exception that the plated film containing the fluorocarbon polymer particles is deposited directly on the base material without depositing the intermediate plated film. The description of the remaining constitution is omitted because of its constitution being the same as the constitution of Embodiment 1. It should be noted that the constitutions of Embodiment 1 and the Modified Examples other than Modified Example 3 of Embodiment 1 may be applied to Modified Example 3, if appropriate.

The plated film 10d deposited on the moving blade 23d is composed of the plated film 12 containing the fluorocarbon polymer particles deposited directly on the surface of the base material 1. Even by doing so, the fluorocarbon polymer particles 13P, some of which are exposed at the surface of the plated film 10d, effectively prevent the particulates, such as the $SiO_2$ particles contained in the steam or the gases to be compressed, from adhering. If the plated film 12 containing the fluorocarbon polymer particles is formed by a method using the autocatalyst reactions of any of the metals belonging to the eighth group in the periodic table, the surface of the base material 1 is alkaline degreased and then the surface 1S of the base material 1 is acid pickled and electrolytically cleaned to activate. Subsequently, the plated film 12 containing the fluorocarbon polymer particles is deposited by the above described method. Alternatively, the plated film 12 containing the fluorocarbon polymer particles may be deposited by electroplating such as the Watts bath technique.

Evaluation Example

Test pieces on which the plated film of the present invention was deposited were prepared to evaluate the adhesion of the particles. In preparing the test pieces, the plated film containing the fluorocarbon polymer particles using PTFE and PFA for the fluorocarbon polymer particles and Ni—P, Ni—B and Ni for the plated matrix material was deposited on the base material (SUS 410J1). The plated film containing the fluorocarbon polymer particles was deposited on each of the test pieces by Ni—P electroless plating, Ni—B electroless plating, or Ni electrolytic plating. In addition, other test pieces were prepared, in which the intermediate plated film containing no fluorocarbon polymer particles was deposited on the base material, on the surface of which, an additional plated film containing the fluorocarbon polymer particles was deposited. For all of the test pieces, the surface occupation ratio of the fluorocarbon polymer particles to the plated film were greater than or equal to 10%. Note that the surface occupation ratio of the fluorocarbon polymer particles was obtained from an enlarged photograph of the surface of the plated film containing the fluorocarbon polymer particles.

For a comparative example, test pieces were prepared in which the surface occupation ratio of the fluorocarbon polymer particles to the plated film containing the fluorocarbon polymer particles was 7%. In addition, two types of test pieces according to conventional examples were also prepared, in which an organic paint containing the fluorocarbon polymer particles was coated on the base material made of the stainless steel, and in which no plated film was deposited on the base material made of the stainless steel. The film structures of the test pieces, on which the plated film containing the fluorocarbon polymer particles of the present invention were deposited, and of the test pieces for the comparative example and the conventional examples are as shown in Table 1.

TABLE 1

| | No | Film structure | | | | Magnification for silica particle adhesion |
|---|---|---|---|---|---|---|
| | | Fluorine materials | Surface occupation ratio (%) | Matrix | Intermediate film and its material | |
| Present Invention | 1 | PTFE | 10 | Ni—P electroless plating | None | 0.52 |
| | 2 | PTFE | 20 | Ni—P electroless plating | None | 0.32 |
| | 3 | PTFE | 20 | Ni—B electroless plating | None | 0.33 |
| | 4 | PTFE | 20 | Ni—P electroless plating | Ni—P electroless plating | 0.32 |
| | 5 | PTFE | 20 | Ni—P electroless plating | Ni electroplating | 0.33 |
| | 6 | PTFE | 20 | Ni electroplating | None | 0.35 |
| | 7 | PFA | 20 | Ni—P electroless plating | Ni—P electroless plating | 0.38 |
| Comparative Example | 8 | — | 7 | Ni—P electroless plating | None | 0.95 |
| Conventional Examples | 9 | Base material SUS 410J1 (non-coated) | | | | 1.0 |
| | 10 | Organic paint containing fluorocarbon polymer particles | | | | 0.80 |

Method for Depositing the Plated Film Containing the Fluorocarbon Polymer Particles The plated film containing the fluorocarbon polymer particles was deposited on the surface of the base material by a procedure described below.

(1) The fluorocarbon polymer particles with an average diameter in the range from 0.3 μm to 0.5 μm were dispersed in the electroless plating liquid including surface-active agent.

(2) The plating liquid was kept at 90° C. and the test pieces (SUS 410J1) with a size of 20 mm×20 mm×5 mm were immersed in the plating liquid to deposit the plated film containing the fluorocarbon polymer particles (Kaniflon: registered trademark). The thickness of the plated film was 10 μm for the plated film containing the fluorocarbon polymer particles and 2 μm for the intermediate plated film (plated film containing no fluorocarbon polymer particles) respectively.
(3) Subsequently, the test pieces were heated at 300° C. to 350° C.
(4) When electroplating was applied, a Watts bath was used for the plating liquid. The fluorocarbon polymer particles were dispersed in the same manner and the plated film containing the fluorocarbon polymer was deposited under the conditions of a temperature of 50° C. and a current density of 5 A/dm$^2$. Using the test pieces for the test samples, the particle adhesiveness of these experimental films was evaluated by a test apparatus for particle adhesion evaluation.

Method for Conducting the Particle Adhesion Evaluation Test

Figure 9:
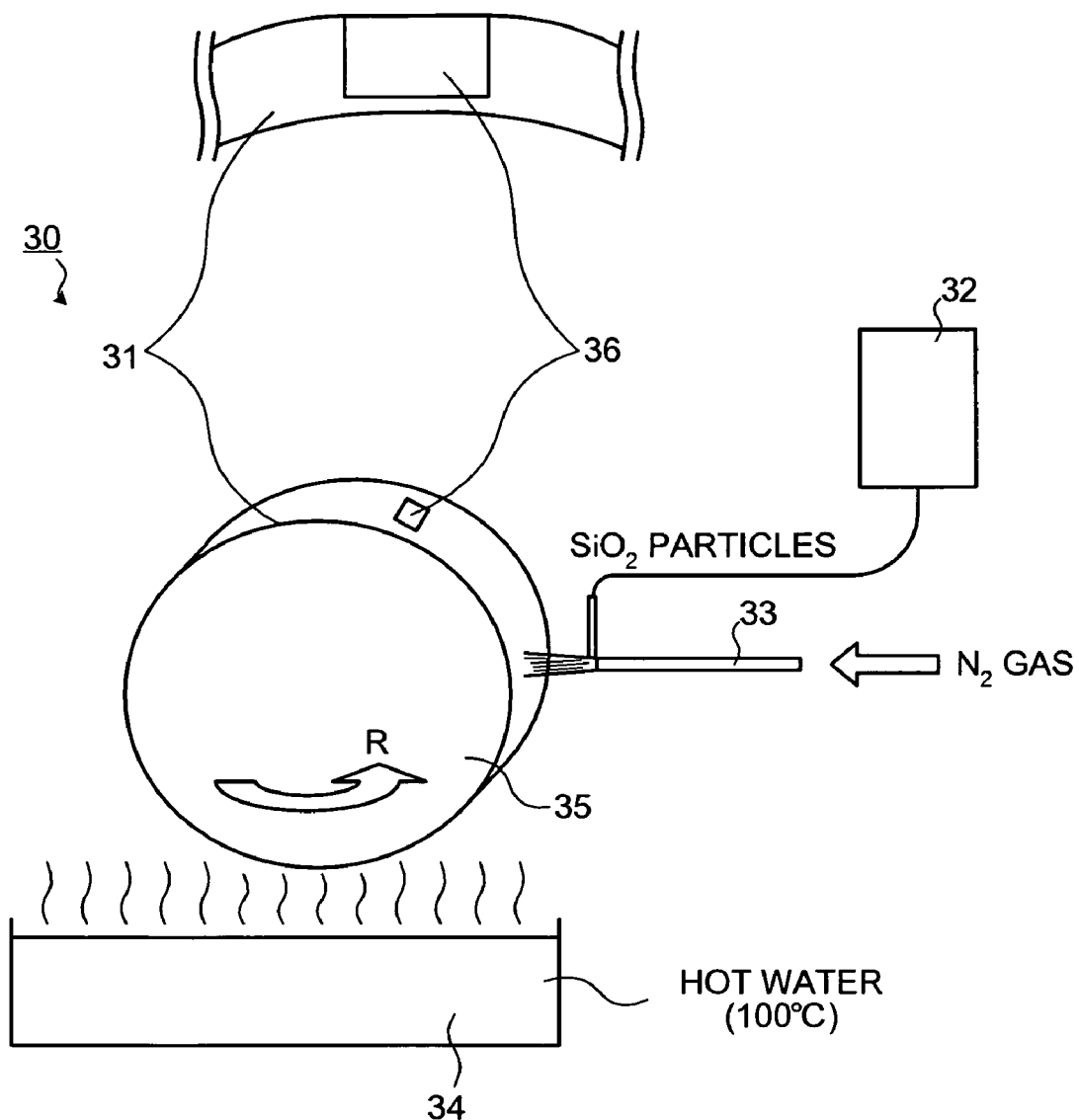
FIG. 9 is a schematic view showing a test apparatus used in carrying out a particle adhesion evaluation test.

FIG. 9 is a schematic view showing a test apparatus used for the particle adhesion evaluation test. At the test apparatus 30, the test pieces 36 prepared by the above procedure are fitted into a drum 31 for the particle adhesion evaluation test. The particle adhesion evaluation test involves a step of spraying the particulates of silica (SiO$_2$) carried by Nitrogen (N$_2$) gas on the surfaces of the test pieces 36 for adhesion while the drum 31 is being rotated. The N$_2$ gas is sprayed through a nozzle 33 and silica particles are supplied from a particle feed unit 32 to the area in the vicinity of the outlet of the nozzle 33. On the lower side of the drum 31, a water tank 34 is disposed. Water in the water tank 34 boiling at 100° C. is supplied onto the test pieces 36. Moreover, the test pieces 36 are heated by a heater 35 installed inside of the drum 31.

Test Conditions

The rotation rate of the drum 31 was set to 10 rpm. Consequently, the test pieces 36 fitted into the drum 31 also rotated at the same rotation rate as the rotation rate of the drum 31. Fumed silica (grade 50) provided by NIPPON AEROSIL Co., Ltd was used for the silica particles. The test pieces 36 were heated at 80° C. The collision speed of the silica particles were 300 m/sec and test period was 80 hours.

Evaluation Method

Based on differences among the mass values of the test pieces 36 measured before and after the test, the amount of adhered silica particles was determined. The ratio of the amount Y(g) of silica particles adhered to the surface of each of test pieces 36 to the amount X(g) of silica particles adhered to the surface (surface roughness Rz=3.5 μm) of the base material (SUS 410J1) of each of the test pieces 36 was calculated by the following formula (3) assuming that a magnification for silica particle adhesion was Z.

$$Z=Y/X \quad (3)$$

The result of the test is shown in Table 1. Note that the word "No" in the following paragraphs corresponds to the words "Test piece No." in Table 1. As shown in Table 1, among the test pieces (Nos. 1 to 7) on which the plated film containing the fluorocarbon polymer particles of the present invention was deposited, the maximum magnification for silica particle adhesion was 0.52 (No. 1). As known from the result, the amount of particles adhered to the plated film containing the fluorocarbon polymer particles of the present invention is approximately less than or equal to half of the amount of particles adhered to the base material (No. 9). Compared with the base material (No. 10), on which an organic paint containing the fluorocarbon polymer particles was coated, the amount of particles adhered to the surface of the test piece was less than or equal to 60%. Thus, the plated film containing the fluorocarbon polymer particles of the present invention demonstrates a farther superior effect of reducing the amount of adhered particles to the plated film, as compared to the conventional art.

As for the plated films containing the fluorocarbon polymer particles of the present invention, when the surface occupation ratio of the fluorocarbon polymer particles was 10% (No. 1), the amount of adhered silica particles was approximately less than or equal to 60% compared with the films according to the conventional example (the organic paint containing the fluorocarbon polymer particles was coated, No. 10). As for the plated films (Nos. 2 to 7) containing the fluorocarbon polymer particles of the present invention, when the surface occupation ratio of the fluorocarbon polymer particles was 20%, the amount of adhered silica particles was less than or equal to 50% compared to the conventional example (the organic paint containing the fluorocarbon polymer particles was coated, No. 10), no significant variation being observed among the test pieces.

The presence of the intermediate plated film did not affect the magnification for silica particle adhesion. As for fluorocarbon polymer particles, PTFE (Nos. 1 to 6) has a slightly smaller magnification for silica particle adhesion than PFA (No. 7) has. Depending on the method (namely, electroplating or electroless plating) for depositing the plated film containing the fluorocarbon polymer particles, almost no difference in the magnification of silica particle adhesion was observed. It should be noted that the hardness of the film deposited by Ni electroplating fell within the range from 150 Hv to 300 Hv, while the hardness of the film deposited by electroless Ni—P plating (electroless Ni—P plated film containing the fluorocarbon polymer particles) fell within the range from 250 Hv to 300 Hv (amorphous) and when the film was heated at 300° C. to 350° C. after plating, the hardness of the film fell within the range from 450 Hv to 600 Hv (crystalline). The crack-sensitivity of the film had a close correlation to the hardness of the film. The film deposited by Ni electroplating is softer than the film deposited by electroless Ni—P plating and is difficult to crack. Now, the effects of nitriding on the fatigue strength of the films are described in detail below.

Figure 10:
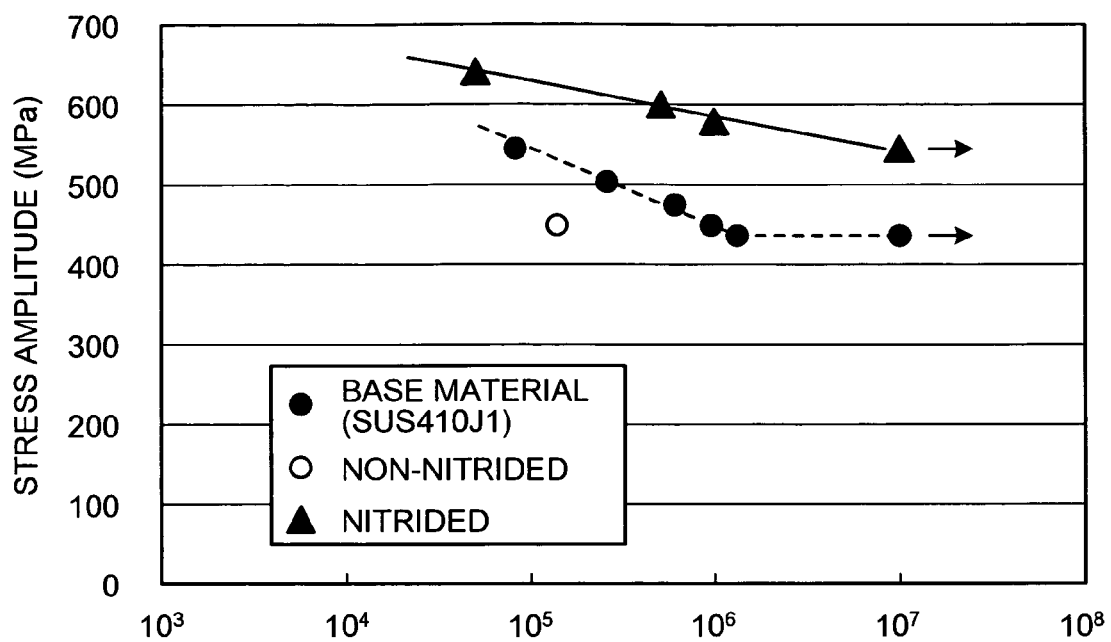
FIG. 10 is an explanatory diagram illustrating the relationship between stress amplitudes and the numbers of repeated breakages.

FIG. 10 is an explanatory diagram showing the relationship between the stress amplitudes and the number of repeated breakages. For the base materials of the test pieces, SUS 410J1, was used and for the test pieces themselves, smoothed gauge test pieces were used. These test pieces, namely the Ni—P plated films containing the fluorocarbon polymer particles, were prepared in two types of processes: one type of the test pieces was nitrided to improve the fatigue strength by the surface modification process; and the other type of the test pieces was not nitrided. The radical nitriding technique was used in the nitriding process. The rotating bending fatigue test was conducted to obtain the number of repeated breakages of each of the test pieces. The test was conducted at a rotation rate of 3600 rpm (Revolution Per Minute) at room temperature. The test pieces, SUS 410J1 (not plated), were tested as a control group.

As shown in FIG. 10, the non-nitrided test pieces on which the Ni—P plated film containing the fluorocarbon polymer particles was deposited, broke at the rotation rate of about $10^5$ rpm. On the other hand, no breakage was observed in the nitrided test pieces on which the Ni—P plated film containing the fluorocarbon polymer particles was deposited, even at the rotation rate of about $10^7$ rpm. Accordingly, when the surface modification treatment for improving fatigue strength was conducted on the base material, the fatigue strength of the base material may be improved, suggesting that it enables the base material on which the plated film was deposited to resist higher stress amplitudes compared with the non-plated base material. Note that the surface modification treatment for improving the fatigue strength exhibited no difference in the test result applied to the shot peening process compared with the case of the nitriding.

As mentioned above, the rotating machine and the parts of the rotating machine according to the present invention are useful for the parts assembled in the rotating machine such as a turbine and a compressor and in particular, are suitable for reducing the amount of particulates contained in the steam or the gases to be compressed which may adhere to the parts of the machine.

Parts of the rotating machine according to the present invention are parts such as moving blades and impellers, which are used in rotating machines such as a steam turbine and a compressor. The parts of the rotating machine have a plated film containing the fluorocarbon polymer particles, in which, some of the particles contained in a plated matrix are exposed at the surfaces of the plated matrix. These particles of the fluorocarbon polymer particles exposing at the plated film effectively prevent the particulates such as corpuscular silica and iron oxide particles from adhering to the parts of the rotating machine when the parts of the rotating machine come into contact with a gas containing the particulates.

In addition, as for the parts of the rotating machine of the present invention, the plated films are deposited on the surfaces of metal-plated intermediate films deposited on the surfaces of the parts of the rotating machine. This improves the adhesiveness between the plated film containing the fluorocarbon polymer particles and a base material of the part of the rotating machine to enhance the resistance of the plated film containing the fluorocarbon polymer particles to cracks in the plated film (crack-resistance). This achieves the prevention of the plated film containing the fluorocarbon polymer particles from peeling off. Moreover, beginning with a crack occurring in the plated film containing the fluorocarbon polymer particles, the fatigue strength of the base material deteriorates, while as for the parts of the rotating machine of the present invention, the crack-resistance of the plated films containing the fluorocarbon polymer particles is improved, thereby preventing the fatigue strength of the base materials which compose the parts of the rotating machine from deteriorating.

The intermediate films are deposited on the surfaces of the parts of the rotating machine by electroplating. The deposition of these films further improves the crack-resistance of the plated films containing the fluorocarbon polymer particles.

These intermediate Ni-plated films improve the adhesiveness between the plated films containing the fluorocarbon polymer particles and the base materials of the parts of the rotating machine, further enhancing the crack-resistance of the plated films containing the fluorocarbon polymer particles.

The surface modification treatment process is applied to the surfaces of the parts of the rotating machine to improve the fatigue strength of the portions at which the intermediate plated films or the plated film are deposited.

Generally, the fatigue strength of the plated base material deteriorates, however, as for the parts of the rotating machine of the present invention, the fatigue strength of the base material is improved before the plated film is deposited and therefore, even if the fatigue strength of the base material deteriorates, the deposited film minimizes the adverse effect of the deterioration. The surface modification treatment includes, for example, a nitriding process and shot peening process.

In addition, as for the parts of the rotating machine of the present invention, another film composed of the fluorocarbon polymer particles is deposited on the surface of the plated film. Accordingly, the particulates such as the silica and iron oxide particles may be more effectively prevented from adhering.

In addition, the plated matrix of the plated film containing the fluorocarbon polymer particles is made of Ni, or any of Ni-based metals, thereby enhancing their corrosion-resistance.

In addition, in the plan view, a ratio of the exposed portion of the fluorocarbon polymer particles from the surface of the plated matrix is greater than or equal to 10% relative to the occupied area of the surface of the plated film. This effectively prevents the particulates such as silica and iron oxide particles from adhering.

In addition, the plated films containing the fluorocarbon polymer particles are deposited by electroless plating. This allows the plated films containing the fluorocarbon polymer particles to be homogeneously deposited even on the surfaces of complicated three dimensional parts.

Thus, the parts of the rotating machine and the rotating machine of the present invention effectively prevent the particulates contained in the gas, such as silica and iron oxide particles from adhering onto the surfaces of the parts of the rotating machine, which works with the gases containing the particles.

What is claimed is:

1. A moving blade or impeller for a rotating machine, the moving blade or impeller comprising:
   a nitrided layer formed on a surface of the moving blade or impeller by a radical nitridation treatment to improve fatigue strength;
   a plated film deposited on the nitrided layer for preventing particulates contained in a gas that comes into contact with the plated film as the rotating machine rotates from adhering to the plated film,
   wherein the plated film includes a plated matrix made of nickel or a nickel-based metal, and fluorocarbon polymer particles,
   wherein the fluorocarbon polymer particles are contained in the plated matrix and at least some of the fluorocarbon polymer particles are exposed at a surface of the plated matrix, and
   wherein a ratio of the exposed fluorocarbon polymer particles on the surface of the plated matrix to the occupied area of the surface of the plated film is 10% to 40%.

2. The moving blade or impeller for a rotating machine according to claim 1,
   wherein the fluorocarbon polymer particles comprise at least one selected from the group consisting of polytetrafluoroethylene (PTFE), tetrafluoroethylene-hexafluoropropylene (FEP) copolymer, tetrafluoroethylene-perfluoroalkylvinylether (PFA) copolymer, polyvinylidenefluoride (PVDF), ethylene-chlorotrifluoroethylene (ECTFE) copolymer, and ethylene-tetrafluoroethylene (ETFE) copolymer.

3. The moving blade or impeller for a rotating machine according to claim 1, further comprising a fluorocarbon polymer film deposited on the plated film containing the fluorocarbon polymer particles, the fluorocarbon polymer film comprising at least one selected from the group consisting of polytetrafluoroethylene (PTFE), tetrafluoroethylene-hexafluoropropylene (FEP) copolymer, tetrafluoroethylene-perfluoroalkylvinylether (PFA) copolymer, polyvinylidenefluoride (PVDF), ethylene-chlorotrifluoroethylene (ECTFE) copolymer, and ethylene-tetrafluoroethylene (ETFE) copolymer.

4. A rotating machine comprising:
a rotating portion with which a gas containing particulates comes into contact; and
at least one moving blade or impeller for a rotating machine according to claim 1 provided on the rotating portion.

5. A moving blade or impeller for a rotating machine, the moving blade or impeller comprising:
a nitrided layer formed on a surface of the moving blade or impeller by a radical nitridation treatment to improve fatigue strength;
a plated film deposited on the nitrided layer, the plated film containing a plated matrix made of nickel or a nickel-based metal and fluorocarbon polymer particles, wherein the fluorocarbon polymer particles are contained in the plated matrix and at least some of the fluorocarbon polymer particles are exposed at a surface of the plated matrix for preventing particulates contained in a gas that comes into contact with the plated film as the rotating machine rotates from adhering to the plated film; and
an intermediate plated film deposited between the plated film and the nitrided layer, and
wherein a ratio of the exposed fluorocarbon polymer particles on the surface of the plated matrix to the occupied area of the surface of the plated film is 10% to 40%.

6. The moving blade or impeller for a rotating machine according to claim 5,
wherein the intermediate plated film is deposited by electroplating.

7. The moving blade or impeller for a rotating machine according to claim 5,
wherein the intermediate plated film is made entirely of nickel.

8. The moving blade or impeller for a rotating machine according to claim 5,
wherein the fluorocarbon polymer particles comprise at least one selected from the group consisting of polytetrafluoroethylene (PTFE), tetrafluoroethylene-hexafluoropropylene (FEP) copolymer, tetrafluoroethylene-perfluoroalkylvinylether (PFA) copolymer, polyvinylidenefluoride (PVDF), ethylene-chlorotrifluoroethylene (ECTFE) copolymer, and ethylene-tetrafluoroethylene (ETFE) copolymer.

9. The moving blade or impeller for a rotating machine according to claim 5, further comprising a fluorocarbon polymer film deposited on the plated film containing the fluorocarbon polymer particles, the fluorocarbon polymer film comprising at least one selected from the group consisting of polytetrafluoroethylene (PTFE), tetrafluoroethylene-hexafluoropropylene (FEP) copolymer, tetrafluoroethylene-perfluoroalkylvinylether (PFA) copolymer, polyvinylidenefluoride (PVDF), ethylene-chlorotrifluoroethylene (ECTFE) copolymer, and ethylene-tetrafluoroethylene (ETFE) copolymer.

10. A rotating machine comprising:
a rotating portion with which a gas containing particulates comes into contact; and
at least one moving blade or impeller for a rotating machine according to claim 7 provided on the rotating portion.

11. The moving blade or impeller of the rotating machine according to claim 1, wherein a ratio of the exposed fluorocarbon polymer particles on the surface of the plated matrix to the occupied area of the surface of the plated film is 10% to 40%.

12. The moving blade or impeller of the rotating machine according to claim 5, wherein a ratio of the exposed fluorocarbon polymer particles on the surface of the plated matrix to the occupied area of the surface of the plated film is 10% to 40%.

13. The moving blade or impeller for a rotating machine according to claim 1, wherein the fluorocarbon polymer particles comprise at least one selected from the group consisting of tetrafluoroethylene-hexafluoropropylene (FEP) copolymer, tetrafluoroethylene-perfluoroalkylvinylether (PFA) copolymer, polyvinylidenefluoride (PVDF), ethylene-chlorotrifluoroethylene (ECTFE) copolymer, and ethylene-tetrafluoroethylene (ETFE) copolymer.

14. The moving blade or impeller for a rotating machine according to claim 1, further comprising a fluorocarbon polymer film deposited on the plated film containing the fluorocarbon polymer particles, the fluorocarbon polymer film comprising at least one selected from the group consisting of tetrafluoroethylene-hexafluoropropylene (FEP) copolymer, tetrafluoroethylene-perfluoroalkylvinylether (PFA) copolymer, polyvinylidenefluoride (PVDF), ethylene-chlorotrifluoroethylene (ECTFE) copolymer, and ethylene-tetrafluoroethylene (ETFE) copolymer.

15. The moving blade or impeller for a rotating machine according to claim 1, wherein the surface is martensitic stainless steel, and the nitrided layer is applied to the martensitic stainless steel.

16. The moving blade or impeller for a rotating machine according to claim 5, wherein the fluorocarbon polymer particles comprise at least one selected from the group consisting of tetrafluoroethylene-hexafluoropropylene (FEP) copolymer, tetrafluoroethylene-perfluoroalkylvinylether (PFA) copolymer, polyvinylidenefluoride (PVDF), ethylene-chlorotrifluoroethylene (ECTFE) copolymer, and ethylene-tetrafluoroethylene (ETFE) copolymer.

17. The moving blade or impeller for a rotating machine according to claim 5, further comprising a fluorocarbon polymer film deposited on the plated film containing the fluorocarbon polymer particles, the fluorocarbon polymer film comprising at least one selected from the group consisting of tetrafluoroethylene-hexafluoropropylene (FEP) copolymer, tetrafluoroethylene-perfluoroalkylvinylether (PFA) copolymer, polyvinylidenefluoride (PVDF), ethylene-chlorotrifluoroethylene (ECTFE) copolymer, and ethylene-tetrafluoroethylene (ETFE) copolymer.

18. The moving blade or impeller for a rotating machine according to claim 5, wherein the surface is martensitic stainless steel, and the nitrided layer is applied to the martensitic stainless steel.

\* \* \* \* \*